United States Patent
Mariani et al.

(10) Patent No.: US 10,248,492 B2
(45) Date of Patent: Apr. 2, 2019

(54) METHOD OF EXECUTING PROGRAMS IN AN ELECTRONIC SYSTEM FOR APPLICATIONS WITH FUNCTIONAL SAFETY COMPRISING A PLURALITY OF PROCESSORS, CORRESPONDING SYSTEM AND COMPUTER PROGRAM PRODUCT

(71) Applicant: Intel Corporation, Santa Clara, CA (US)

(72) Inventors: Riccardo Mariani, San Giuliano Terme (IT); Michele Borgatti, San Giuliano Terme (IT); Stefano Lorenzini, San Giuliano Terme (IT)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 15/501,767

(22) PCT Filed: Jul. 31, 2015

(86) PCT No.: PCT/IB2015/055833
§ 371 (c)(1),
(2) Date: Feb. 3, 2017

(87) PCT Pub. No.: WO2016/020815
PCT Pub. Date: Feb. 11, 2016

(65) Prior Publication Data
US 2017/0228279 A1    Aug. 10, 2017

(30) Foreign Application Priority Data
Aug. 4, 2014 (IT) ............... TO2014A0633

(51) Int. Cl.
*G06F 11/00*     (2006.01)
*G06F 11/07*     (2006.01)
*G06F 11/36*     (2006.01)

(52) U.S. Cl.
CPC .......... *G06F 11/079* (2013.01); *G06F 11/008* (2013.01); *G06F 11/0721* (2013.01); *G06F 11/3688* (2013.01)

(58) Field of Classification Search
CPC ............. G06F 11/0721; G06F 11/3688; G06F 11/008; G06F 11/079
See application file for complete search history.

(56) References Cited

U.S. PATENT DOCUMENTS

2003/0172074 A1* 9/2003 Highleyman ....... G06F 11/2041
2008/0141065 A1   6/2008 Okabe
(Continued)

FOREIGN PATENT DOCUMENTS

JP   2004-038654   2/2004

OTHER PUBLICATIONS

Office Action dated Feb. 22, 2018 for European Patent Application No. 15762748.0, 5 pages.
(Continued)

*Primary Examiner* — Jason B Bryan
(74) *Attorney, Agent, or Firm* — Schwabe, Williamson & Wyatt, P.C.

(57) ABSTRACT

A method for executing programs (P) in an electronic system for applications provided with functional safety that includes a single-processor or multiprocessor processing system and a further independent control module, the method comprising: performing an operation of breaking-down of a program (P) into a plurality of parallel sub-programs (P1, . . . , Pn); assigning execution of each parallel sub-program (P1, . . . , Pn) to a respective processing module of the system, periodically performing self-test operations ($A_{stl}$, $A_{sys}$, $A_{chk}$) associated to each of said sub-programs (P1, . . . , Pn).

12 Claims, 10 Drawing Sheets

(56) References Cited

U.S. PATENT DOCUMENTS

2012/0005534 A1    1/2012  Li et al.
2012/0137171 A1*   5/2012  Zalman .................. G06F 11/10
                                                          714/10
2017/0054592 A1*   2/2017  Olrog ................... G06F 9/5027

OTHER PUBLICATIONS

International Search Report and Written Opinion of the ISA for PCT/IB2015/055833 dated Nov. 4, 2015, 9 pages.

* cited by examiner

METHOD OF EXECUTING PROGRAMS IN AN ELECTRONIC SYSTEM FOR APPLICATIONS WITH FUNCTIONAL SAFETY COMPRISING A PLURALITY OF PROCESSORS, CORRESPONDING SYSTEM AND COMPUTER PROGRAM PRODUCT

This application is the U.S. national phase of International Application No. PCT/IB2015/055833 filed Jul. 31, 2015 which designated the U.S. and claims priority to IT Patent Application No. TO2014A000633 filed Aug. 4, 2014, the entire contents of each of which are hereby incorporated by reference.

TECHNICAL FIELD

The present disclosure relates to techniques for executing programs in the context of electronic systems for applications in which functional safety is required. The electronic system described is based upon an architecture comprising a single processor (CPU) or else a plurality of processors. The techniques described envisage:
performing an operation of decomposition of the program to be executed via said architecture into a plurality of parallel sub-programs;
assigning execution of each parallel sub-program to a respective processing module of the system, in particular a physical processor or virtual machine associated to one of said processors; and
carrying out, periodically according to a cycle frequency of the program during normal operation of said architecture, self-testing operations designed to meet the functional-safety targets.

Various embodiments may be applied to functional safety. In particular, various embodiments find application in electronic systems in the field of industrial robotics and industrial controls, and in the technical field of electronic systems for automotive applications of assistance to the driver and of partially or completely automatic driving.

Technological Background

Functional-safety standards, such as IEC 61508, ISO 13849, and ISO 26262 contain requirements for detection of potentially dangerous failures in integrated electronic systems. For instance, in the standard ISO 26262, one of the requirements is defined as "probabilistic metric for HW random failures (PMHF)", which to a first approximation is defined, for a given failure model F, as the product between the base failure probability ($\lambda$), the distribution of this probability on the failure model ($\lambda F$), the one's complement of the fraction of safe failures (1-s) and the one's complement of the diagnostic coverage of the non-safe failures (1-k).

By "safe failures" are meant failures that are such that the mission of the program run on the electronic device will not be affected or else will be affected in a safe way; i.e., the mission terminates with a known state, the so-called "safe state", where there is no danger for functional safety.

Processors of a single-processor or multiprocessor processing system are among the most critical elements of such integrated electronic systems, and their complexity increases with the advances made in the art.

In regard to the processors, the aforesaid standards (for example, ISO 26262-5, Annex D, Table D.4) present various possible techniques for obtaining the diagnostic values of coverage of non-safe failures, designated by k, which are as high as possible.

The above techniques have found various implementations in the prior art.

Architectures, such as for example the ones described in the U.S. Pat. No. 6,233,702 or in the U.S. Pat. No. 7,472,051, necessarily require a modification of the hardware of the processor in order to guarantee functional safety so as to implement a complete or reduced form of redundancy of the processor.

Architectures, such as for example the ones described in the U.S. Pat. No. 5,513,319, envisage that an independent element (watchdog) is queried periodically by the processor at pre-set time intervals. However, the functional safety that it can guarantee is limited in so far as only a small percentage of the failures of the processor can be detected with such a method—basically the ones that cause a substantial difference in the program flow.

OBJECT AND SUMMARY

The embodiments described herein have the purpose of improving the potential of the methods according to the prior art as discussed previously, in particular making it possible to achieve a high diagnostic coverage on complex architectures, such as those of modern multiprocessors, likewise limiting the coverage target for the single processor and limiting or removing the need for modifications to the hardware.

Various embodiments achieve the above purpose thanks to a method having the characteristics recalled in the ensuing claims. Various embodiments may refer also to an architecture, as they may likewise refer to a computer program product that can be loaded into the memory of at least one computer (e.g., a terminal in a network) and comprises portions of software code designed to carry out the steps of the method when the program is run on at least one computer. As used herein, the above computer program product is understood as being equivalent to a computer-readable means containing instructions for controlling the computer system so as to co-ordinate execution of the method according to the invention. Reference to "at least one computer" is understood as emphasizing the possibility of the present invention to be implemented in a modular and/or distributed form. The claims form an integral part of the technical teachings provided herein in relation to the invention.

Various embodiments may envisage that the method comprises self-testing operations that include:
diagnostic-self-testing operations, i.e., ones which carry out tests on the processor and compare the result with values pre-calculated during the design stage;
operations of self-testing of system values measured on the architecture (purely by way of example, voltage and temperature) and comparison of the result with expected reference ranges; and
operations of comparison between partial results of said sub-programs,
and said self-testing operations comprise:
generating respective self-test data regarding the self-testing operations, and carrying out checking operations on said self-test data;
exchanging said self-test data continuously using a message protocol with a further independent control module;
carrying out at least in part said checking operations in said further independent control module; and
carrying out said operation of decomposition of the program into a plurality of parallel sub-programs so as to respect a failure-probability target that is a function of a coverage value determined by said diagnostic-self-test operations, of a given coverage value of the operations of self-testing of system values measured on the architecture, and of a coverage value determined by the operations of comparison between the partial results of the aforesaid sub-programs.

The procedure of decomposition of the program described and the partitioning of the self-testing operations into the aforesaid three separate operations (self-testing via diagnostic tests, self-testing via monitoring of the system values, and self-testing via comparison of the intermediate results) enables an improvement over the known art. In particular the tripartition enables distribution of the targets in an optimised way, i.e., lowering the targets for the operations that—for the particular type of system on which the method described is applied—would require an intense design effort or modifications of the hardware in order to be achieved, and, instead, raising it for those operations that in such a context are easier to carry out.

BRIEF DESCRIPTION OF THE DRAWINGS

Various embodiments will now be described, purely by way of example, with reference to the annexed drawings, wherein.

DETAILED DESCRIPTION

In the ensuing description, numerous specific details are provided in order to enable maximum understanding of the embodiments that are provided by way of example. The embodiments may be implemented with or without specific details, or else with other methods, components, materials, etc. In other circumstances, well-known structures, materials, or operations are not illustrated or described in detail so that various aspects of the embodiments will not be obscured. Reference in the course of the present description to "an embodiment" or "one embodiment" means that a particular structure, peculiarity, or characteristic described in connection with its implementation is comprised in at least one embodiment. Hence, phrases such as "in an embodiment" or "in one embodiment" that may recur in various points of the present description do not necessarily refer to one and the same embodiment. Furthermore, the particular structures, peculiarities, or characteristics may be combined in any convenient way in one or more embodiments.

The various references are provided herein merely for convenience of the reader and do not define the scope or meaning of the embodiments.

Figure 1:
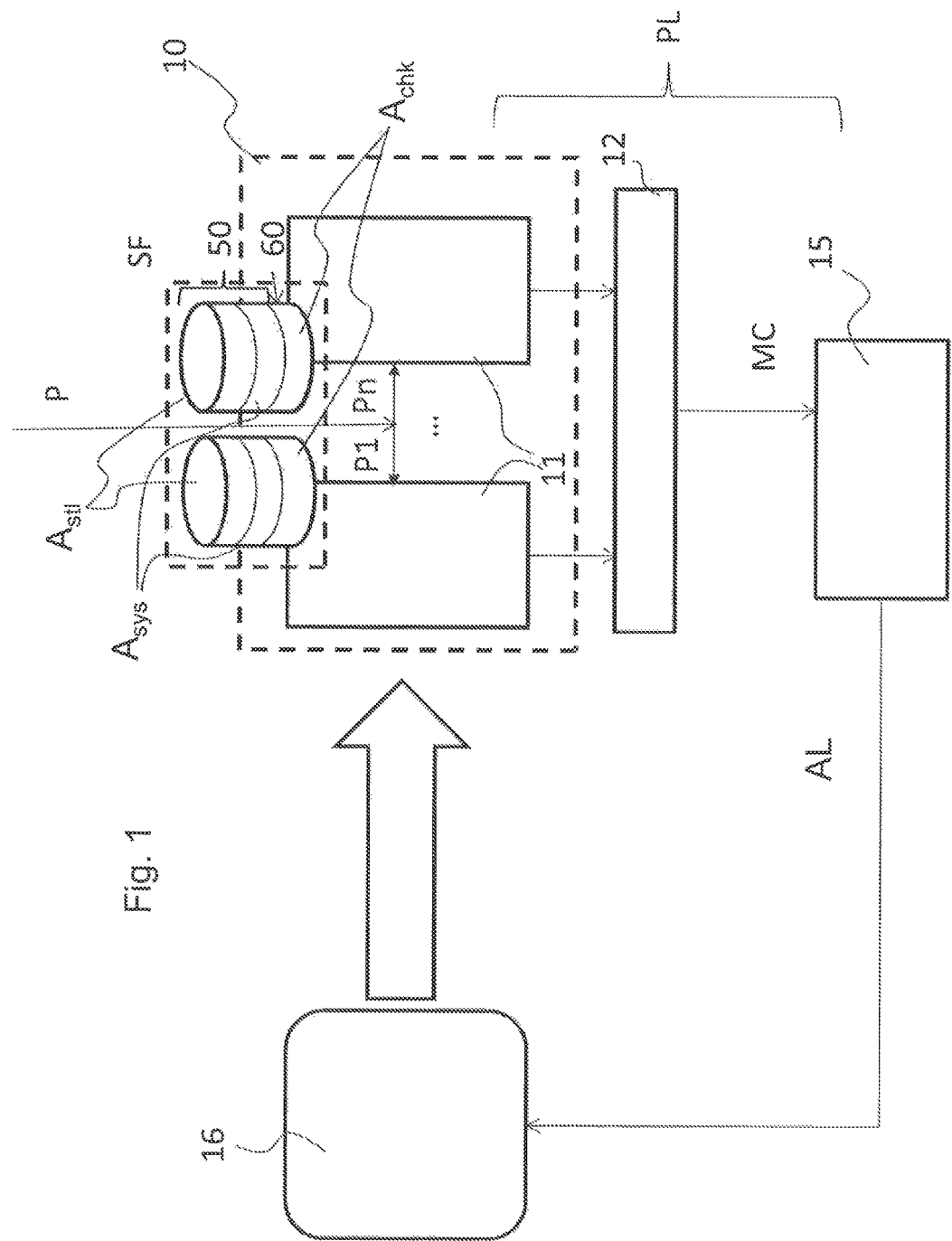
FIG. 1 shows a block diagram of an embodiment of a multiprocessor architecture of an electronic system configured for implementing the method described herein.

FIG. 1 illustrates a processing architecture provided with functional safety of an integrated electronic system for applications provided with functional safety. The electronic system may, as has been said, be, for example, electronic systems for automotive applications of assistance to the driver and for partially or completely automatic driving, which comprises a processing architecture that operates in functional safety.

The aforesaid architecture comprises a multiprocessor processing system; namely, implemented on the multiprocessor processing system, designated as a whole by the reference number 10, is a functional-safety system based upon provision of a number of processing and control channels. By "channel", in the context of safety and in particular of IEC 61508, is meant an element or set of elements that independently implements/implement a functional-safety function, or "safety function SF" (see IEC 61508-4, 3.3.6). This may for example be a microprocessor, a virtual machine, or else some other element.

Figure 3:
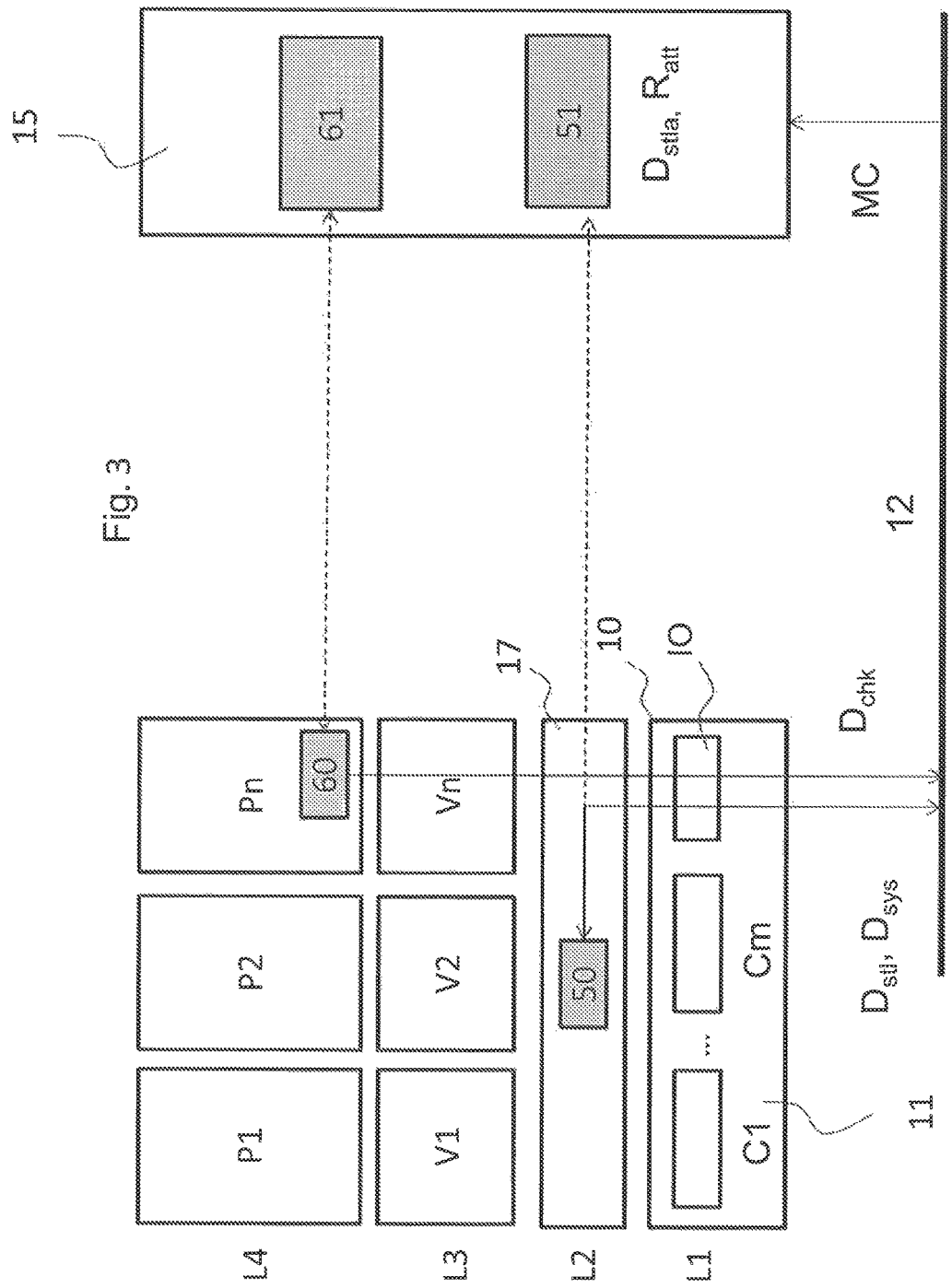
FIG. 3 shows a diagram of software levels of the multiprocessor architecture configured for implementing the method described herein.

The multiprocessor processing system 10 comprises a plurality of processor modules 11. The aforesaid processor modules 11 mainly comprise independent CPUs, that is, so-called "cores". As described in greater detail in what follows, a processor module in a multicore system (as also in a single-core system) may refer in the present description also to a virtual machine generated by virtualization software on one of the aforesaid cores. With reference to FIGS. 1 and 3, by "processor module" 11 is hence meant herein one of a plurality of cores C1 . . . Cm of the multiprocessor 10 or else even one of a plurality of virtual machines V1, . . . , Vn implemented on one or more of the aforesaid cores C1, . . . , Cm.

The multiprocessor 10 can be architecturally built in different ways, which comprise both homogeneous architectures (the ones in which the various processing cores 11 are the same) and heterogeneous architectures (the ones in which the processing cores 11 are different), as well as shared-memory architectures of distributed-memory architectures that communicate by exchange of messages. From the standpoint of physical implementation multiple solutions are possible, which range from a higher degree of integration, where the cores 11 are provided in the one and the same integrated circuit, to a lesser degree, where the cores 11 of the multiprocessor 10 are provided on different integrated circuits or on different and separate modules.

In this context, represented in the example of FIG. 1 is an architecture that comprises just one of the aforesaid multiprocessors 10, which in turn comprises the plurality of processor modules 11. Run on the aforesaid multiprocessor 10 are the application functions, i.e., the programs P, for example for control or assistance to driving of a motor vehicle, and the safety functions SF aimed at the self-testing of the integrity of the system and detection of possible failures or malfunctioning that may arise in the logic and the solid-state memories of the multiprocessors 10 themselves or in their sub-parts.

In addition to the multiprocessor 10, the architecture provided with functional safety represented in FIG. 1 envisages an independent processing unit represented by the control module 15, which is configured for analysing, processing, and comparing the content of flows of monitoring and control messages MC coming from the various operating programs in the multiprocessor 10 that implement the aforesaid self-testing operations, which are carried out by the processors 11 of the multiprocessor 10 in order to enable monitoring of their functional safety and detection of any possible malfunctioning that may arise in the logic that makes them up, or else more in general in the flow of execution of sub-programs P1, . . . , Pn, into which the program P is broken down so that it can be run on the respective processor modules 11.

The multiprocessor 10 and the control module 15 communicate through communication means 12, which enable the various processor modules 11 of the multiprocessor 10 to send and receive the aforesaid monitoring and control messages MC to and from the processing and comparison unit, i.e., the control module 15, which can, in turn, respectively receive and send messages, for example alarms, from and to the multiprocessor 10.

As has been said, represented for simplicity in FIG. 1 is just one multiprocessor 10, but in actual fact the architecture may envisage a number of processors or multiprocessors that exchange monitoring and control messages with the control module 15 through respective communication means 12.

Figure 2:
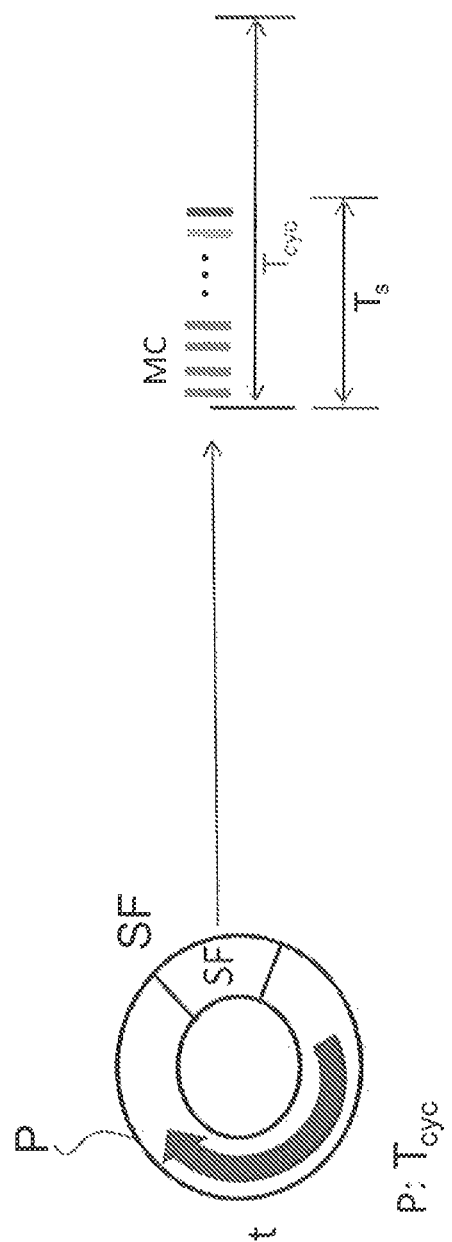
FIG. 2 shows a diagram representing a safety function used by the method described herein.

The method described herein applies to all these possible configurations of a multiprocessor 10 on which a safety function, designated by SF in FIG. 2, is implemented. By "safety function" is meant a function that operates in the framework of a system for which respect of the requirements of functional safety referred to in the aforementioned standards is required. FIG. 2 represents in fact a safety function SF that is carried out within a software process, and a program P, which is to be run on the multiprocessor 10. In FIG. 2 the program P as a whole, which is a process that is executed cyclically, is represented by an annulus that represents cyclic execution in time t with a cycle time $T_{cyc}$. The safety function SF occupies a temporal segment of the aforesaid program P, i.e., a sector of the annulus, the safety function SF being in general a part of the program P, and being then executed for a safe-execution time $T_s$ shorter than the cycle time $T_{cyc}$. Also indicated n FIG. 2 is how, during execution of the safety function SF, i.e., during the safe-execution time $T_s$, monitoring and control messages MC are exchanged, in particular with an independent control module 15.

As indicated in FIG. 1, the method described herein envisages decomposing the program P down into parallel sub-programs P1, . . . , Pn, which are, in the architecture of FIG. 1, each implemented on a core 11. Even though one multiprocessor is illustrated in FIG. 1, the sub-programs P1, . . . , Pn can be divided also in the case where the processing system presents just one processor, for example via virtualization techniques. A technical solution available in the field of operating systems for multiprocessors is virtualization technology, which enables precisely virtualization of the hardware on which application programs are run on a single core, or, as illustrated in what follows, also on the cores 11 of the multiprocessor 10 (reference is made, for example, to the so-called "hypervisors" or "virtual-machine monitors"). According to the paradigm of use of virtualization technologies, the program P is broken down into a plurality of parallel processes P1, . . . , Pn that may each be run on a virtual machine V1, . . . , Vn so as to obtain a parallel execution that is functionally equivalent to the starting program P that comprises the safety function SF.

Decomposing into sub-programs P1, . . . , Pn to be assigned to the various virtual machines or cores is guided in known systems by considerations of a functional type regarding the functions of the specific program P. As is more fully described in what follows, the method described herein envisages, instead, carrying out the aforesaid operation of decomposing into sub-processes P1, . . . , Pn as a function of respect of given constraints of coverage for the presence of failures of a random type that are required by functional-safety standards envisaged in industrial and automotive applications. The aforesaid constraints are hence referred to in general as functions f(k) of a level of coverage k required by the standard.

The functional-safety architecture of FIG. 1 is moreover configured for carrying out, in the framework of the safety function SF, self-test operations, described in greater detail in FIG. 3, which that in general comprise:

diagnostic-self-test operations $A_{stl}$, which carry out diagnostic tests, by executing self-test libraries (STLs) 50, associated to the processors 11, as indicated in FIG. 3;

operations $A_{sys}$ of self-testing of system values measured on the architecture, which are also preferably carried out by executing self-test libraries (STLs) 50; and operations $A_{chk}$ of comparison between the sub-programs P1, . . . , Pn, via application-comparison software modules 60, described with reference to FIG. 3.

Represented, in this connection, in FIG. 2 are the self-test libraries (STLs) 50 and the application-comparison software modules 60, which are associated to each of the cores 11 and each implement the three types of self-test operations $A_{stl}$, $A_{chk}$, $A_{sys}$. As has been said, preferably the STLs 50 comprise software both for carrying out diagnostic-self-test operations $A_{stl}$ and for carrying out the operations $A_{sys}$ of self-testing of system values measured on the architecture, but in variant embodiments the operations $A_{sys}$ of self-testing of system values can be executed via a separate and dedicated software module.

The aforesaid three types of self-test operations $A_{stl}$, $A_{sys}$, $A_{chk}$ comprise generating on the multiprocessor 10 self-test data, i.e., respectively, diagnostic-self-test data $D_{stl}$, system-self-test data $D_{sys}$, application-self-test data $D_{chk}$. As has been mentioned and described in greater detail in FIG. 3, there is moreover envisaged generation of the aforesaid self-test data $D_{stl}$, $D_{sys}$, $D_{chk}$ in software modules represented by the diagnostic-self-test libraries 50 and by the application-comparison software modules 60, and sending them within the monitoring and control messages MC so that checking operations are carried out on the aforesaid self-test data $D_{stl}$, $D_{sys}$, $D_{chk}$, via modules represented in FIG. 2 as logic modules 51, 61 comprised in the control module 15.

Illustrated once again in FIG. 1 are the communication systems 12 used for exchange of the monitoring and control messages MC between the processor modules that make up the multiprocessor 10 and the control module 15. The aforesaid communication channels may be made up of segments of a point-to-point type, or else created in a hierarchical way and possibly with multiple access to a shared physical medium, such as, in the example illustrated, a communication bus. Determination of the content of the monitoring and control messages MC to be exchanged is obtained via execution of the self-test operations $A_{stl}$, $A_{sys}$, $A_{chk}$ in addition to other operations described in detail in what follows, and sending of the monitoring and control messages MC themselves is obtained during regular time intervals in which the processor modules 11 making up the multiprocessor 10 are taken off execution of the respective application programs P1, . . . , Pn obtained from decomposition of the program P, to which they are normally dedicated for the most part of the time, and are assigned to execution of special code, i.e., the code of the programs of the self-test libraries 50. In particular, the monitoring and control messages MC are generated at different hierarchical levels of the software being executed in the multiprocessor 10, as described in greater detail in what follows. The exchange of monitoring and control messages MC between the system multiprocessor 10 and the control module 15 is obtained according to a communication protocol PL, which is also described in greater detail in what follows.

According to a main aspect of the method described herein, it is envisaged to carry out the operation of decomposition of the program P into a plurality of parallel sub-programs P1, . . . , Pn so as to respect a failure-probability target, designated by g for the general case and by g12 in the two-processor example presented hereinafter, which is a function for each sub-program P1, . . . , Pn of a respective coverage value $k_{stl}$ determined by the aforesaid diagnostic-self-test operations $A_{stl}$, of a respective given coverage value $k_{sys}$ of the operations $A_{sys}$ of self-testing of values measured on the multiprocessor architecture 10, and of a coverage value $k_{chk}$ determined by the operations $A_{chk}$ of comparison between the sub-programs P1, . . . , Pn.

The coverage in terms of diagnostic coverage (DC) or of safe-failure fraction (SFF—see, in this connection, the safety standard IEC61508) of each component the safety architecture in FIG. 1, in particular for the part of software program of the diagnostic-self-test operations $A_{stl}$ (self-test libraries 50), is determined as a function of the following characteristics of the system:
 safety-integrity level (SIL) to be achieved for the system, in particular a two-channel system; this results in a requirement of coverage k that is to be respected by the system;
 base-cycle frequency $f_{cyc}$ of the operations and diagnostic-test interval (DTI); in this regard, as illustrated in FIG. 2, the program P as a whole is executed cyclically with a cycle time $T_{cyc}$ and hence a frequency of the base cycle $f_{cyc}$; the safety function SF occupies a temporal segment of the aforesaid program P for a safe-execution time Ts shorter than the cycle time $T_{cyc}$;
 number and type of the checks made, in particular in the architecture considered, by the control module 15 on the results of the diagnostic-self-test operations $A_{stl}$ in unit time; the safe-execution time $T_s$ is a function of the constraint of coverage f(k) required by the safety standard;

Furthermore, as is also described in detail in what follows, the operation of data exchange is executed with a sequence of messages in which an amount of data q and a frequency f are chosen according to a further function of the aforesaid failure-probability target g to be respected.

As additional step there may be envisaged a check to verify whether the coverage-target values k determined as a function of the aforesaid failure-probability target g have been effectively achieved via failure injection in a simulation step, for example according to what is described in the patent No. EP 1 980 964 A1 filed in the name of the present applicant.

There now follows a detailed description of the operation of decomposition of the program P into a plurality of parallel sub-programs P1, . . . , Pn according to a function of a failure-probability target g to be respected.

In order to obtain the lowest failure probability g without hardware modifications and with the minimum impact on the program P, understood both as size of the program memory and as execution time, the method described provides in fact decomposition of the program P into two or more independent programs P1, P2, . . . , Pn.

The architecture provided with functional safety described is set up as a function of a failure-probability target g and hence as a function of values of coverage k to be achieved. Specific examples refer in what follows substantially to a two-channel system, i.e., one in which the program P is broken down in two processes P1 and P2 operating on two cores C1 and C2 or two virtual machines V1 and V2 that supply two channels of results.

Hence, taking as example the case of an operation of decomposition into two programs P1, P2 and assuming for simplicity that the two independent programs P1, P2 are run on two identical processor modules 11 with the same base failure probability λ equal to 1 and with the same distribution of failure models Λ equal to 1, the failure probability of the multiprocessor system made up of the processors 1 and 2 may be described as $$g12 \leq (1-\beta)^{2}*(1-s1)*(1-k1)*(1-s2)*(1-k2)*texp++\beta*(1-s12)*(1-k12) \quad (1)$$

where: k1, k2 are the failure coverages for the two processors, for example C1 and C2, respectively, than run the two programs P1 and P2; s1, s2 are, respectively, the fractions of the safe failures of the two processors C1, C2 that run the two programs P1 and P2; β is the fraction of the failures that can cause a common-cause failure (CCF) between the two processors C1, C2; k12 is the failure coverage that can cause a common-cause failure between the two processors C1, C2; s12 is the fraction of the safe failures common to the two processors C1, C2; and texp is the exposure time of the first failure. The time texp is defined by the type of use of the system and by the type of failure model, and in the limit may be equal to the service time of the system. Given a sub-program Pi, assuming a base failure probability λ equal to 1 and a distribution of failure models Λ equal to 1, the pair of values si, ki, which are the fraction of safe failures of the corresponding processor and the failure coverage, respectively, identifies substantially the failure probability thereof.

Eq. (1) defined previously for the failure-probability target g12 of the two independent sub-programs P1 and P2 is determined via the fault-tree-analysis (FTA) arithmetic (see, for example, ISO 26262-10, Annex B); i.e., it corresponds (see FIG. 8) to determining the failure probability of the two sub-programs P1 and P2 connected by a logic function of an AND type in which the respective hardware, on which each program is run is connected to a very low failure probability. Hence, Eq. (1) expresses the resulting mean failure probability, i.e., the failure-probability target, approximately as a product of the respective probabilities and the exposure time t.

It is hence possible to extend easily Eq. (1) for an arbitrary number of independent programs: for example, in the case of three programs, the three-input AND gate can be broken down into two two-input AND gates, and then the resulting formula can be constructed using the formula described above for two programs P1 and P2.

In other words, the value of failure probability of the sub-programs P1, . . . , Pn with respect to a failure-probability target g to be respected is calculated by considering the sub-programs P1, . . . , Pn as inputs of an AND gate having as many inputs as are the sub-programs, breaking down the aforesaid AND gate into two-input AND gates, and calculating the probability target as a function of the product of the failure probability at the output of each two-input AND gate and the execution time.

Once again applying the FTA arithmetic, the failure probability g12 is completed by a sum (i.e., a logic function of an OR type) with a common-cause term $\beta \cdot (1-s12) \cdot (1-k12)$ that takes into account the failures CCF.

Hence, the calculation of the aforesaid failure-probability target g comprises considering the sub-programs P1, ..., Pn as inputs of an AND logic function AG having as many inputs as are the sub-programs P1, ..., Pn, breaking down this AND logic function (AG) into two-input AND logic functions having as inputs the pairs that can be composed between the aforesaid sub-programs P1, ..., Pn, calculating the product of the failure probability, i.e., the pairs ki, si, at output from each two-input AND gate, by the complement of the common-cause-failure fraction $\beta$ and of the exposure time texp, calculating the aforesaid probability target g as a function of the result of the previous operation added to a value obtained by applying OR functions to common-cause failures, i.e., the pairs kij, sij between all the pairs ij of sub-programs P1, ..., Pn, multiplied by the common-cause-failure fraction $\beta$.

Figure 8:
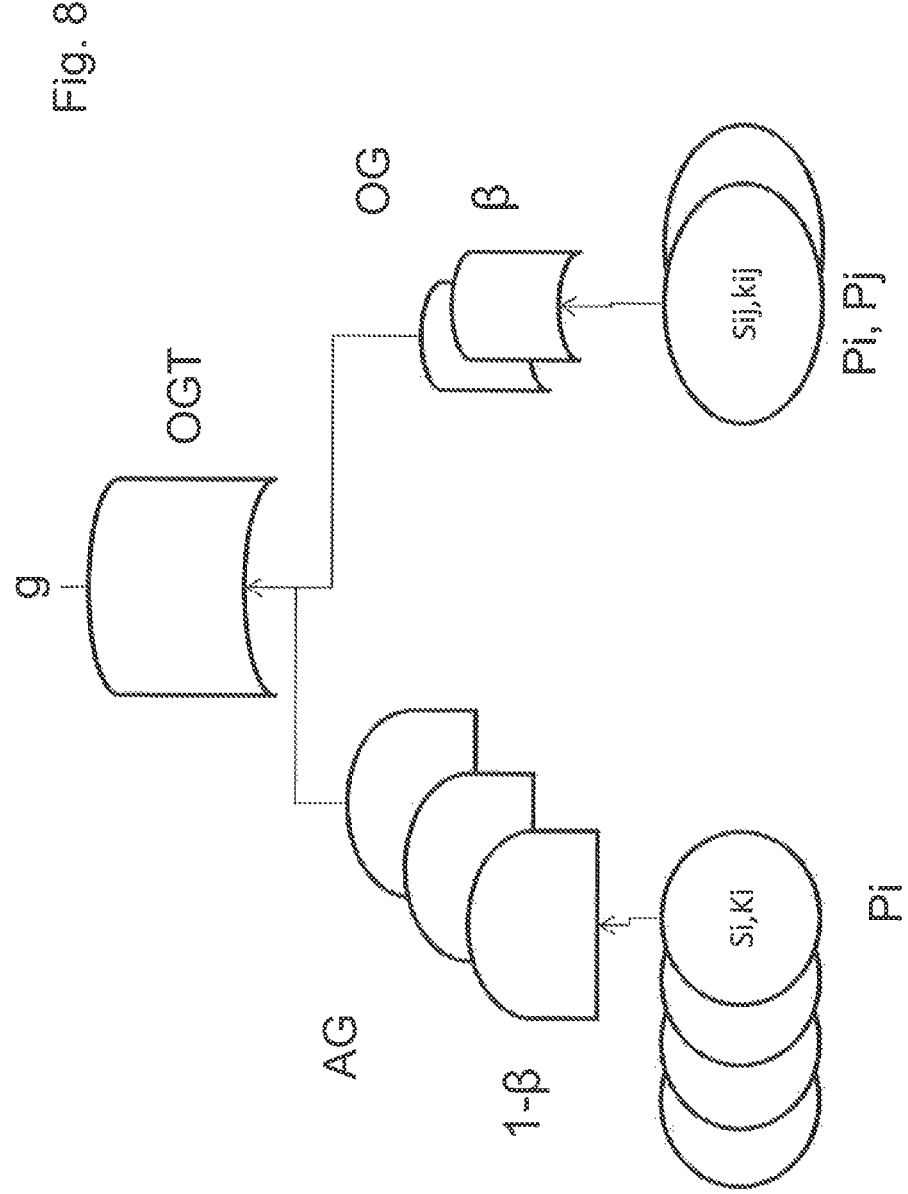
FIG. 8 shows a logic diagram representing an example of logic implementation of a decomposition operation of the method described herein.

FIG. 8 illustrates via a logic circuit the operation of calculation of the probability target g by implementing the logic functions according to what has just been discussed. Designated by AG is the n-input AND gate, which can be broken down into two-input gates according to what has been referred to above and which receives as input for each sub-program Pi the coverage ki and the fraction of safe failures si (in the example of the formula (1) k1, s1 and k2, s2). The output is multiplied by 1-$\beta$, which is the complement of the fraction of the failures that can cause a common-cause failure. The AND gate (as envisaged in the FTA arithmetic) enables the product by the exposure time to be computed. Designated by OG are multi-input OR gates that for two sub-programs Pi and Pj receive at input the common-cause-failure coverage kij and the fraction sij of the common-cause safe failures (in the example k12, s12). The output is multiplied by $\beta$, which is a fraction of the failures that can bring about a common-cause failure. A gate OGT then computes the sum of the outputs of the gates AG and OG to yield the general form g of the failure target g12 of Eq. (1).

One of the characteristics that distinguish the method is that the failure coverages k1, k2, and k12 are defined as the combination of three contributions:

$k_{stl}$, i.e., the coverage fraction guaranteed by execution of the diagnostic-self-test operations $A_{stl}$ (carried out via the self-test library 50, in particular in co-operation with the module 51 present on the module 15);

$k_{chk}$, i.e., the coverage fraction guaranteed by performing the comparison between intermediate results of the programs P1 and P2, i.e., by carrying out the self-test operation $A_{chk}$ (carried out in the comparison component 60, in particular in co-operation with the module 61 present on the control module 15);

$k_{sys}$, i.e., the coverage fraction guaranteed by the comparison of the system-self-test data $D_{sys}$ obtained from the self-test operation $A_{sys}$ (carried out, preferably once again in co-operation between modules of the multiprocessor 10 and of the module 15, between system parameters of the multiprocessor architecture 10, such as the temperature and the voltage of the processors C1, C2 on which the programs P1 and P2 are run, and reference values or limit values, i.e., ranges $R_{att}$.

In particular, for the coverage k1, k2 of the programs P1 and P2 and the common-cause coverage k12 we have:

$$k1 = k_{stl1} \cup k_{chk} \cup k_{sys}, k2 = k_{stl2} \cup k_{chk} \cup k_{sys},$$
$$k12 = k_{stl12} \cup k_{chk} \cup k_{sys} \qquad (2)$$

The union operator $\cup$ indicates that the two coverages are combined according to the rules of the set theory as a function of their individual failure coverage.

The coverage target of the self-test library $k_{stl1}$ associated to the library 50 entered into the program that is run on the processor C1, of the self-test library $k_{stl2}$ associated to the library 50 entered into the program that is run on the processor C2, and of the self-test library $k_{stl12}$ associated to the library 50 entered into the program that is run in the processor C1 and/or processor C2 for covering the common-cause failures—and hence their structure and their programming—is determined in order to achieve the failure-probability target g12 as a function of the parameters $\beta$, t and s1, s2, and s12.

In practice, hence, the method envisages providing in the safety architecture three different types of self-test operations $A_{stl}$, $A_{chk}$, $A_{sys}$, to which coverages $k_{stl}$, $k_{chk}$, $k_{sys}$ are associated and, given a number of sub-programs P1, ..., Pn into which the program P has been broken down in functional safety, for each type of self-test operation $A_{stl}$ or $A_{chk}$ or $A_{sys}$, associating the aforesaid self-test operation $A_{stl}$ or $A_{chk}$ or $A_{sys}$ to each sub-program P1, ..., Pn and/or processor 11 by defining the parameters of the self-test operation $A_{stl}$ or $A_{chk}$ or $A_{sys}$ so that the resulting values of coverage $k_{stl}$ or $k_{chk}$ or $k_{sys}$ will respect, together with the ones deriving from the other two types of self-test operations according to what is expressed in Eq. (1), the failure-probability target g defined for the system.

According to a further aspect of the method described herein, the aforesaid diagnostic-self-test operation $A_{stl}$ on the basis of the self-test libraries 50 defined with respective self-test coverages $k_{stl1}$, $k_{stl2}$ and $k_{stl12}$ for the two processors C1 and C2, operation of comparison $A_{chk}$ between intermediate results, application-self-test data $D_{chk}$, of the programs P1 and P2, with comparison coverage $k_{chk}$, and operation of comparison $A_{sys}$ between system-self-test data $D_{sys}$ of the processors C1, C2 on which the programs P1 and P2 are executed, and expected ranges $R_{att}$, which identifies the system coverage $k_{sys}$ are not executed within the multiprocessor 10, but completed in sequence via a further element independent of the multiprocessor 10, the control module 15, which completes them. This is obtained via a data exchange (the messages MC) between the multiprocessor 10 and the control module 15.

The comparison coverage $k_{chk}$ is determined as a function of the amount of data q exchanged at each comparison with respect to the total amount and as data-exchange period t (the inverse of which is the data-exchange frequency f) with respect to a target time T—typically calculated as corresponding to the process safety time (PST) or fault-tolerant time interval (FTTI) of the functional-safety standards referred to above:

$$k_{chk} = \min(1, q \cdot T/t) \qquad (3)$$

The data-exchange period t corresponds to the safe-execution time Ts.

From Eqs. (1) and (2) we find that the coverages k1, k2, k12 depend upon the value of the comparison coverage $k_{chk}$, and that the failure-probability target is a function of k1, k2, k12. Consequently, we also find that, given a failure-probability target g, the values of the amount of data q exchanged and of the frequency f of exchange of the data are sized so that the comparison coverage $k_{chk}$ will assume a value such that, once it is entered into Eqs. (1) and (2), the failure-probability target g will be respected.

The correspondence of the coverages $k_{stl1}$, $k_{stl2}$, $k_{stl12}$, $k_{chk}$ and $k_{sys}$ with respect to the target values determined as described above are tested via failure injections during simulation.

Hence, the method described herein envisages carrying out, in a context of electronic systems provided with functional safety that execute a given program P, where the operation of decomposition of the program P into subprograms and partitioning of the self-test operations into three separate operations, namely, self-testing $A_{stl}$ via diagnostic tests, self-testing $A_{sys}$ via monitoring of the system values, and self-testing $A_{chk}$ via comparison of the intermediate results, according to a relation, Eq. (1), that links the failure target to the coverages of the sub-programs, which are in turn defined as a function of the coverages $k_{stl}$, $k_{chk}$, $k_{sys}$ of the three self-test operations $A_{stl}$, $A_{chk}$, $A_{sys}$, enable precise identification of the coverage targets to be assigned to each of the three self-test operations, likewise enabling distribution of the targets in an optimised way.

The architecture described with reference to FIG. 1 moreover envisages carrying out the aforesaid self-test operations in co-operation with an external module, the control module 15, via a communication protocol PL for exchange of monitoring and control messages MC. By "external module" is here meant a module external to the processors 11, even though the aforesaid module can be included in the integrated circuit in which the processors are provided. The method described envisages, that is, self-test operations that, unlike self-test operations executed in known systems, which generate and check the self-test data in one and the same single-processor or multiprocessor processing system, envisages generating the self-test data within the single-processor or multiprocessor processing system, but completing the self-test operation by carrying out the check via a separate independent element, the control module 15.

In order to describe in greater detail the above and other aspects, FIG. 3 illustrates schematically a model of abstraction of an embodiment of the solution described, through a hierarchy of physical and software layers, of an ISO/OSI type, which is also representative of the communication protocol PL.

The aforesaid communication protocol PL is implemented at hierarchical levels in which the messages at the application layer (L4 in FIG. 3) are encapsulated in the protocol PL implemented by the program P, and at a lower level (layer L2 in FIG. 3) the messages regarding the STL 50 are added. As illustrated in FIG. 3, the control module 15 implements the communication protocol PL in a way specular with respect to the aforesaid hierarchical levels. The aforesaid protocol PL arranges the monitoring and control messages MC in a hierarchical frame that enables encapsulation of different packets for different identifiers ID of different processor modules 11 and their routing within the control module 15 towards the processing units pre-arranged for their analysis and comparison, as is represented in greater detail with reference to FIG. 6. In what follows, designated by VC are the logic channels that address a specific system layer, designated by ID are the identifiers that address the physical channels referring to a processing element, designated by C1, . . . , Cm are physical cores, designated by V1, . . . , Vm are virtual machines. In particular, in the protocol PL a message MC, of a packet type, comprises the following fields for numeric values:

fields dedicated to hierarchization of the messages MC as a function of the logic channels VC to which they belong;

fields for the cardinal and temporal sequence of the packets of the messages MC;

field of commands for the control module 15; and payload field containing the data with respect to which the control module 15 must complete the self-test operation.

The control module 15 is moreover configured for carrying out a check of integrity on the content of the message MC by means of an algorithm that enables error detection and/or correction. Preferably, the algorithm CRC32 is used as error-detection algorithm (in FIG. 7 it is implemented in the module 112a).

Entering into greater detail of the representation of the physical and software hierarchical levels in FIG. 3, designated by L1 is a physical layer for hardware execution, corresponding to the multiprocessor 10, which comprises a multiplicity of cores C1, . . . , Cm and an input/output module IO. This is typically implemented by one or more integrated circuits.

Designated by L2 is a supervisor layer L2, represented by a module for management of the virtual machines 17, a software component commonly referred to as "hypervisor", which has the function of virtualization of the existing hardware of the physical layer L1 making available at a virtualization level L3 a number n of virtual machines V1, . . . , Vn with corresponding operating system such that they can be used as independent units, the so-called "guest virtual machines". The module for management of the virtual machines 17 guarantees that the various virtual machines V1, . . . , Vn and the corresponding sub-programs P1, . . . , Pn, into which the program P is to be broken down, for example manually, will have given characteristics necessary for the program P. The aforesaid decomposition operation may alternatively even not be protected, or protected via modifications of the application itself or rather of its operating system. In the field of application of functional safety the aforesaid characteristics typically include guaranteeing real-time execution and non-interference between execution of different processes. As has been mentioned, the method described herein envisages, instead, that the aforesaid characteristics will take into account only or also a failure-probability target g. In general, a number n of virtual machines is indicated equal to the number of the subprocesses P1, . . . , Pn into which the program P is broken down, where, in the preferred example n=2. Since a number of virtual machines can be obtained on one and the same core, the number m of cores is preferably less than or equal to n.

The module for management of the virtual machines described herein comprises a software component corresponding to the STLs 50, which, as has been mentioned, introduce a test on functional integrity of each of the cores C1, . . . , Cm, as well as peripherals that constitute the hardware underlying it, i.e., the physical layer L1, so as to guarantee that possible failures of a random type that were to arise in the aforesaid underlying hardware are detected with a pre-defined percentage of coverage k. There may be just one library 50 in the case of a homogeneous multiprocessor. The modalities with which a software component, here the component of the STL 50 (or the components of the STL 50 in the case of a non-homogeneous multiprocessor), is integrated in the module for management of the virtual machines 17 are in themselves known to a person skilled in the sector. The component of the STL 50 may be easily integrated in the module for management of the virtual machines 17, in so far as the modules of such a type, for example the hypervisors, which are provided with the known virtualization systems, typically present to the user interfaces that enable integration of additional components. Consequently, it is possible to integrate the component of the STL 50 as additional component, as illustrated in FIG. 3.

An application layer L4 corresponds to the level of the sub-programs P1, . . . , Pn into which the program P is broken down and which are implemented on the virtual machines V1, . . . , Vn. Associated to this application layer L4 is a software module or component, in particular one for each process P1, . . . , Pn, for application comparison 60, specifically referred to as "application safety layer" (ASL), which in general carries out the self-test operation that generates the application-self-test data $D_{chk}$ through comparison between the intermediate results of the channels. More specifically, as has been said, in the method described herein, the application-comparison software module or component 60, in particular one for each process P1, . . . , Pn, obtains the application-self-test data $D_{chk}$, which are then checked and compared in the control module 15.

Figure 6:
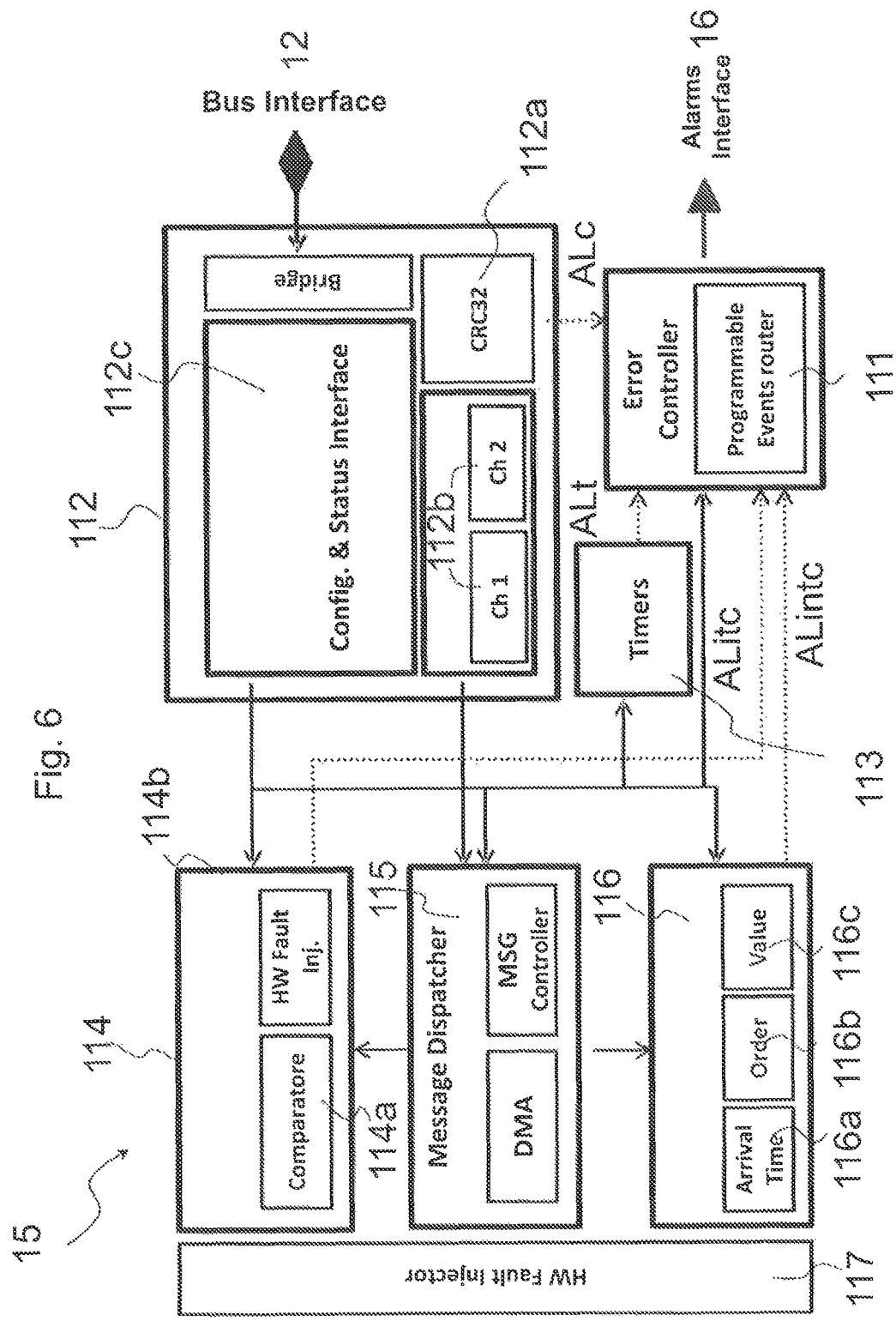
FIG. 6 shows a block diagram of a control module that co-operates with the multiprocessor architecture for implementing the method described herein.

In FIG. 3, the control module 15 is represented as a hardware component, shown in detail in FIG. 6. However, it may also be implemented as software in an equivalent way, with differences in cost/performance of the resulting component. Purely by way of example, the control module 15 may be implemented as a program run by a further processor.

The monitoring and control messages MC exchanged with the control module 15 for completing the self-test operations $A_{stl}$, $A_{sys}$, $A_{chk}$ are divided into two distinct types:

messages containing data that are independent of the characteristics of the program P run on the microprocessor 10; these are, for example, the system-self-test data $D_{sys}$ generated by the operations $A_{sys}$ of self-testing of the system values measured on the architecture, which include measurements of voltage and/or temperature of the cores C1, . . . , Cm of the multiprocessor 10, as well as diagnostic-self-test data $D_{stl}$ regarding intermediate results of calculations made in accordance with one of the specific diagnostic-self-test procedures of the self-test libraries 50;

messages that contain data regarding intermediate results of processing of the program P and that hence depend upon the program P or application itself; these are the application-self-test data $D_{chk}$ generated by operations $A_{chk}$ of comparison between the sub-programs P1, . . . , Pn, via application-comparison software modules 60.

The control module 15 completes the self-test operations $A_{stl}$, $A_{sys}$, $A_{chk}$ started in the multiprocessor 10, via co-operation and exchange of the messages MC, which contain the corresponding self-test data $D_{stl}$ and $D_{chk}$, with the corresponding self-test logic components and application-comparison logic components 61 comprised in the control module 15. As illustrated in FIG. 6, the aforesaid separation is of a logic type; however, the components 51 and 61 may be implemented via one and the same set of hardware modules. This occurs, for example, as follows:

the control module 15 completes the diagnostic-self-test operations $A_{stl}$ by making the comparison, in the logic module 51, of the diagnostic-self-test data $D_{stl}$ regarding intermediate results of calculations made on the cores C1, . . . , Cm of the multiprocessor 10 according to one of the specific diagnostic-self-test procedures of the self-test libraries 50 with a set of pre-calculated and expected values $D_{stla}$ stored in the aforesaid control module 15 and detects possible common-cause failures (CCFs); possible differences between the aforesaid diagnostic-self-test data $D_{stl}$ and the set of pre-calculated and expected values $D_{stla}$ indicate the effect of a failure (whether permanent or transient) in the logic or in the status of the cores C1, . . . , Cm of the multiprocessor 10;

at the same time, the control module 15, by making the continuous comparison in the logic module 61 of application-self-test data $D_{chk}$ produced independently by a pair of processor modules 11, whether virtual machines or cores, in effect performs a function of cross-check between the two corresponding safety channels; and the control module 15 completes with a check also the operation $A_{sys}$ of self-testing of system values measured on the architecture by checking whether the system-self-test data $D_{sys}$ fall within the expected ranges $R_{att}$, which are likewise stored in the control module 15.

The control module 15 makes the aforesaid checks on the monitoring and control messages MC according, for example, to the following criteria for the comparison:

it considers just the order of arrival of the messages MC and whether they belong to the cycle considered for the comparison; hence, preferably, the absolute time of arrival of the individual messages MC is not considered, even though in alternative embodiments it may be considered;

the control module 15 is configured for enabling interposition of messages MC from different sources, i.e., from different processor elements 11, in this case two, duly respecting the order within the sequences for each of the two processor modules 11, as indicated previously; and the control module 15 applies its own checks on a cyclic basis by completing the checks for each of the cycles defined by the cycle time $T_{cyc}$.

There now follows a more detailed description of the self-test libraries 50 and the complementary logic modules 51.

The STLs 50 have the dual function of:

implementing the self-test operation represented by the diagnostic-self-test operation $A_{stl}$ of the multiprocessor processing system 10; this diagnostic-self-test operation $A_{stl}$ is typically implemented by comparing results of calculation, the diagnostic-self-test data $D_{stl}$, processed at the moment of the test itself by the multiprocessor 10, with pre-calculated and stored correct results, the expected results $D_{stla}$, so as to check whether the multiprocessor 10 calculates and executes correctly the program sequences assigned to it; this calculation results $D_{stl}$ are typically obtained from the sequence of operations of an arithmetical and logic type and addressing operations so as to involve in the most complete, extensive, and exhaustive way the various circuit parts of the microprocessor 11; as has been said, in the method and architecture described herein, the operations of comparison with the expected values $D_{stla}$ are implemented in co-operation with am external processing module, the control module 15 (i.e., with the co-operation of the modules 50 and 51 in the hierarchical representation of FIG. 3); and measuring system-self-test data $D_{sys}$, i.e., measuring global parameters, regarding the operation and/or the conditions of operation of each microprocessor; preferably, quantities such as the operating voltage of the microprocessor and the temperature of the system or else the temperature inside the microprocessor are measured; this function has particular importance in identifying situations of possible failure of the microprocessors and in particular situations that may determine common-cause failures in the microprocessors; the aforesaid system-self-test data $D_{sys}$, as has been said, preferably are also obtained via corresponding programs comprised in the libraries 50, even though they may be provided in separate libraries and are checked against the expected ranges $R_{att}$ in the logic modules 51.

In particular and as regards the diagnostic-self-test operations $A_{stl}$ that supply the diagnostic-self-test data $D_{stl}$, the self-test code is typically made up of a set of test segments, designated by 202 and described in further detail with reference to FIG. 7.

The aforesaid test segments are preferably specialized for testing one or more functional units of the microprocessor, of the multiprocessor processing system 10 in this case, in accordance with the targets of an analysis of a "failure modes effects and diagnostic analysis" (FMEDA) type conducted at the integrated-circuit level and, in particular, on the individual cores C1, ..., Cm, or individual processors. The aforesaid FMEDA can be conducted, for example, following the procedure described in the patent application No. EP 1 980 964 A1 filed in the name of the present applicant. The overall target of the test segments that make up the STL 50 of each of the cores C1, ..., Cm is to achieve a level of coverage, specifically a self-test coverage $k_{stl}$ or system coverage $k_{sys}$, such as to satisfy the coverage constraint f(k) pre-determined on the entire logic making up the cores C1, ..., Cm. This is usually an extremely difficult problem for microprocessors with advanced architecture (with deep pipeline, of the super-scalar, multi-issue type), and the difficulty increases markedly as the complexity of the microprocessor undergoing self-diagnostics increases. Functional-safety standards relevant to the application sector defines the minimum requirements for integrity of the system and of the various components of the system.

Hence, the various segments that make up the library 50 must be designed for achieving as a whole, on the entire microprocessor, or core, a target value of coverage $k_{stl}$ such as to enable—via a calculation procedure like the one described hereinafter by applying Eq. 1—a level of integrity to be achieved greater than or equal to what is envisaged by the relevant safety standards.

The programs of the diagnostic-self-test library 50 are typically organized in modular form for reasons of expandability with respect to the various functional units of the microprocessor to be tested and the specialization of simpler units, the test segments 202, on each of the functional units of the microprocessor.

Figure 7:
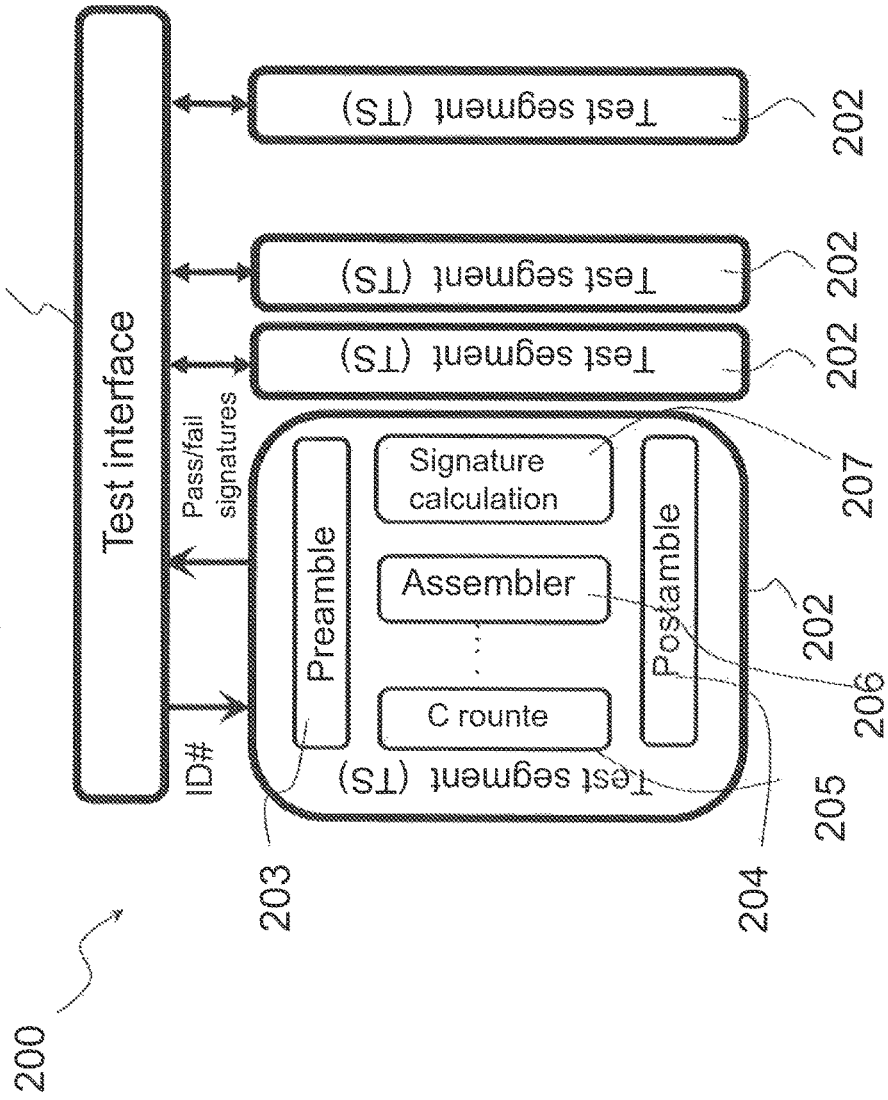
FIG. 7 is a schematic illustration of a test program run by the multiprocessor architecture described herein.

FIG. 7 represents schematically in this connection a self-diagnostic program of the self-test library 50, designated by 200. Test segments 202 comprised in the program 200 are invoked, by indicating the identifier ID# of a test segment to be executed, by a software layer referred to as "test interface 201" that provides the interface towards the software that invokes the self-diagnostic program of the library 50 on a cyclic and regular basis. The test segment 202 replies by sending a pass/fail stamp.

The structure of a test segment 202 is once again of a modular type organized by successive stages, and comprises a preamble 203 and an postamble 204 typically written in a high-level language (ANSI-C), i.e., independent of the architecture of the microprocessor undergoing self-testing. The preamble 202 and the postamble 204 are dedicated to the functions of interface towards the higher layer, to management of the global variables, and to the results of the test that are to be managed with techniques that enable detection of any error that might afflict the result of the test when this is processed by these software modules.

The heart of the test segment 202 is represented by a series of modules 206 written in low-level code, of usually Assembler, specific for the architecture of the microprocessor, designated in the figure as "ASM core code". These modules 206 are the parts that effectively carry out self-testing in so far as they stimulate in a targeted way the various logic and arithmetical and sequential units of the microprocessor so as to activate and render observable a possible failure of the microprocessor itself. The various modules 206 in low-level code can be managed by routines 205 written in high-level language. The test segment 202 comprises a stamp calculator 207 for generating the fail/pass stamps at the end of the checks via the modules 205 and 206. The test segments 202 comprise a plurality of modules 206 in low-level code for obtaining a coverage target with respect to the failures, considering a given set of failure modes defined by the safety analysis.

There now follows a description of the distribution of the self-test analysis, specifically of the diagnostic-self-test operations $A_{stl}$, between the STLs 50 on the processors 11 and the logic components 51 on the control module 15.

Operation of the STLs 50 is based upon the capacity of a microprocessor to test itself by executing code sequences such as to require as much as possible the contribution of the various logics that make it up and producing intermediate results that, appropriately accumulated so that possible errors in the intermediate results cannot be cancelled out, may then produce stamps that, when compared with the same values pre-calculated assuming absence of failures, will yield the highest confidence of detection of a possible failure that might have afflicted the logic undergoing testing. The capacity of activating and detecting the failure depends both upon the capacity of the STL 50 to activate the failure and upon the numeric method used for accumulating the intermediate results so that any possible difference in the intermediate results cannot be cancelled out during the accumulation process. For reasons of clarity, there may be various types of results produced by the STLs 50 in the microprocessor, namely, intermediate results, accumulations, and stamps, the last two being frequently, according to the embodiments, the same. Accumulation is typically necessary for reducing the number of intermediate results that otherwise would not be manageable. In what follows, for simplicity, reference will be made to the intermediate results, including in this definition all three types of result referred to above.

Detection of activation of the failure in the single microprocessor may occur through two distinct mechanisms:

a) detection made by the self-test software itself, which, by detecting a difference in the comparison of the diagnostic-self-test data $D_{stl}$ with the pre-calculated ones, i.e., the expected results $D_{stla}$, determines the error and programmatically adopts countermeasures, pointing out the error detected; this is the typical case in which a failure does not afflict the logic responsible for control of the program flow, but only of the part of arithmetical/logic calculation of the data;

b) stimulation obtained by execution of the tests of the STLs 50, jointly with occurrence of a failure, which determines an error in the sequence of execution of the program P such as to violate test extremes on the execution time t supervised by an external watchdog that notifies the error; this is the typical case in which a failure afflicts the logic responsible for control of the program flow; note that the watchdog may be a dedicated component of the system or else another core that, by carrying out a cross check, manages to detect an erroneous functional or temporal behaviour of execution of the test 50 on the microprocessor considered.

In the aforesaid context, the STLs 50 indicated in FIG. 3 generate diagnostic-self-test data $D_{stl}$ that comprise data regarding the self-test process or else intermediate results (or partial results, accumulations of intermediate results, or else results of the comparison between intermediate results and expected values), which are sent to an external module, the control module 15, which carries out cross-comparison between the diagnostic-self-test data $D_{stl}$ (mechanism a) and control of the program flow (in this way performing the functions of the external watchdog in the context of the mechanism b of stimulation of the STL tests, as described above).

The STLs 50 moreover generate the measured values, including system configurations, i.e., the system-self-test data $D_{sys}$.

The STLs 50 generate corresponding messages MC containing the aforesaid diagnostic-self-test data $D_{stl}$ and system-self-test data $D_{sys}$, to the control module 15, which processes, via the logic components 51, the aforesaid messages generated by the STLs 50 being run on the physical cores C1, . . . , Cm of the multiprocessor 10.

Such processing performed in the logic components is configured for carrying out the following operations:
  carrying out a cross check on the diagnostic-self-test data $D_{stl}$,
    both by implementing an (intra-channel) check of execution flow on the results of the comparison made by the microprocessors C1, . . . , Cm; and
    by making an (inter-channel) cross check on the partial result obtained from processing of the tests of the libraries 50 on each of the microprocessors C1, . . . , Cm;
  carrying out a check on proper temporal execution by checking that the results of the comparison, i.e., the partial results, are sent and received within predetermined time windows (characterized by a maximum and minimum latency) and according to a pre-set order; this enables detection of possible errors in execution of the flow, as indicated previously, as mechanism of detection of the errors in the flow of execution of the tests of the STLs 50 that requires the aid of an external component;
  carrying out a check on whether the measured values $D_{sys}$ actually belong within pre-defined ranges of variability for the quantities being measured (typically, operating voltage and temperature); in addition, there may be carried out checks of consistency of the system configurations that are acquired by the libraries of test 50 and that are representative of the status of the system during execution.

Violation of one of the checks just described implies, by the control module 15, generation of an alarm AL, as indicated in FIG. 6, and implementation of the countermeasures necessary for application of safety. The aforesaid alarm-generation functions send alarms to a module 16, which is a module that controls system resources in the system 10, and may, for example, implement a reset or remove the supply voltage or in any case force reaching of a safe state of the system.

An example of flow of operations associated to the self-test library 50 is the following:
  Repeat forever{
    receive data from all the programs of the self-diagnostic libraries that are executed on the multiprocessor 10, on the supervisor layer, or directly on each of the physical cores
    divide and organize data according to the core, virtual channel, and type
    align the intermediate results corresponding to each program of the libraries 50; check the maximum skew between corresponding intermediate results and the maximum latency
    carry out a cross check between the intermediate results of the libraries 50 and detect errors
    gather the measurements from different cores; check the maximum skew between corresponding intermediate results and the maximum latency
    carry out checks on the range and identify violations
  }

As indicated also in FIG. 6 with reference to the module 116, the control module 15 executes multiple checks of value, order, time (latency, skew, and absolute arrival time using timestamps), and range (in the module 114 with comparator). In particular, the following checks on the self-test data $D_{stl}$, $D_{chk}$, $D_{sys}$ are made:
  the check on the value verifies whether the intermediate results are the same or have been corrected;
  the check on the order verifies whether the order of the messages is correct according to the counters in the message;
  the check on the arrival times compares the time of arrival of the message against an expected minimum and maximum time within the current cycle of execution and/or with the corresponding message from another core; and
  the check on the range verifies whether the value measured belongs to the pre-defined range $R_{att}$.

Each violation of the checks is managed by the control module 15, which notifies an error and then sends alarms to the module 16.

There now follows a more detailed description of application-comparison software components 60 and of the complementary logic modules 61 present in the control module 15.

Hence, as indicated in FIG. 3, present in the sub-programs P1, . . . , Pn run on the virtual machines V1, . . . , Vn are the application-comparison software components that implement the ASL, i.e., procedures of detection of partial results of processing of the sub-programs P1, . . . , Pn. These application-comparison software components 60 also carry out accumulation of the aforesaid partial results and detect differences on the results accumulated (for example, the accumulation of a CRC—cyclic redundant check) by the program with safety function SF. The aforesaid application-comparison software components 60 also carry out organization of the accumulated results and of the differences in frames of application data $D_{chk}$ according to the protocol PL which also forms the subject of the method described herein.

As already mentioned, also the application-comparison software components 60 have corresponding application-comparison logic components 61 in the control module 15. On the application-self-test data $D_{chk}$ the control module 15 carries out cross comparisons, in particular by checking the consistency of the information on the basis of the values of the application-self-test data $D_{chk}$, their order, and the clock time appearing in the packets of application-self-test data $D_{chk}$ generated by the application-comparison software components 60.

Described now in further detail is the communication protocol PL. The organization of the self-test operations $A_{stl}$, $A_{sys}$, $A_{chk}$ envisages definition of different types of sets of messages within the protocol PL according to the software layers L2, . . . , L4 that have generated the message and to the purposes of the message itself.

The following logic channels, or virtual channels, VC are defined. Each of the logic channels VC carries messages coming from at most two different physical channels designated by ID0 and ID1:

VC0: safety VC—safety logic channel originating at the application layer L4 from the program with safety function SF (physical channels with identifiers ID0 and ID1);

VC1: supervisor VC—logic channel originating from the supervisor layer L2 or from the application layer L4, according to the implementation (physical channels with identifier ID0); and VC2: Q&S—quality-and-service logic channel, originating from the supervisor layer L2 or from the virtual-machine and operating-system layer L3, according to the implementation, which carries out maintenance operations on the system (Quality and Service) (physical channels with identifiers ID0 and ID1).

In the preferred embodiment with two physical channels we have that the logic channels VC0 and VC2 support two physical channels ID0 and ID1, which hence are safety channels; and the logic channel VC1 supports only one physical channel, ID0.

The aforesaid definition of the logic channels VC reflects in a particular characteristic of the control module 15 so that it is possible to configure programmable checks and alarms for each of the categories of the sets of messages.

Figure 4:
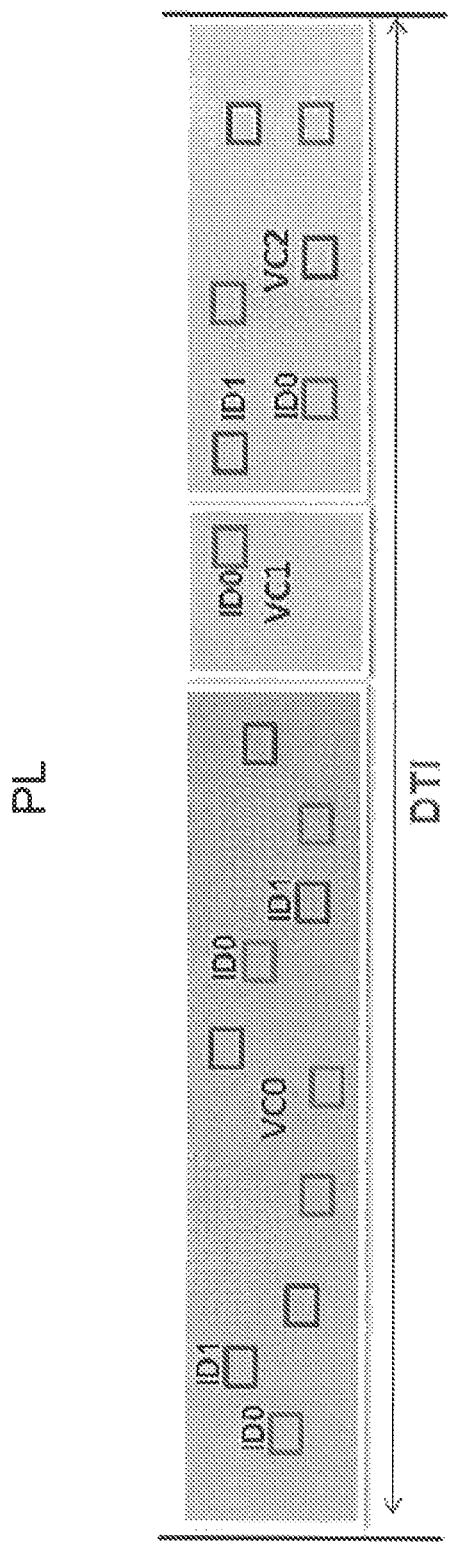
FIG. 4 and FIG. 5 show diagrams representing packets used by a communication protocol implemented by the multiprocessor architecture.

In a preferred embodiment of the control module 15 the order of transmission of the various logic channels VC is predetermined and fixed, for example VC0, VC1, and VC2. FIG. 4 shows an example of a possible embodiment of the communication protocol PL that is reflected by the comparison logic of the control module 15. Shown in particular is the communication channel in which, within a diagnostic-test interval DTI, the logic channels VC0, VC1, VC2 DTI are sent according to the communication protocol PL:

logic channel VC0, for the physical channels ID0, ID1—this carries the data of the safety function SF, i.e., the application-self-test data $D_{chk}$, the consistency of which with the components 61 of the control module 15 is tested: homologous messages belonging to the channels ID0 and ID1 are compared with one another, and the comparison must yield the correct result, i.e., data that, for example, are the same but for differences, such as differences in encoding; the data could in fact be encoded in a different way (for example, complemented in a channel) in order to reduce the probability of common-cause errors;

logic channel VC1, for the physical channel ID0—this carries the diagnostic-self-test data $D_{stl}$ of the diagnostic-self-test library 50 that come from the supervisor layer L2; and logic channel VC2, for the physical channels ID0, ID1—this carries the values measured, i.e., the system-self-test data $D_{sys}$, such as value of temperature, voltage, etc.

Once again with reference to FIG. 4, it should be noted that the total time of transmission on the message-communication channel MC must not exceed the diagnostic-test interval DTI of the system in so far as the transmission must take place in a continuous way and with the same cycle time $T_{cyc}$ as that of the program P in the worst case.

Figure 5:
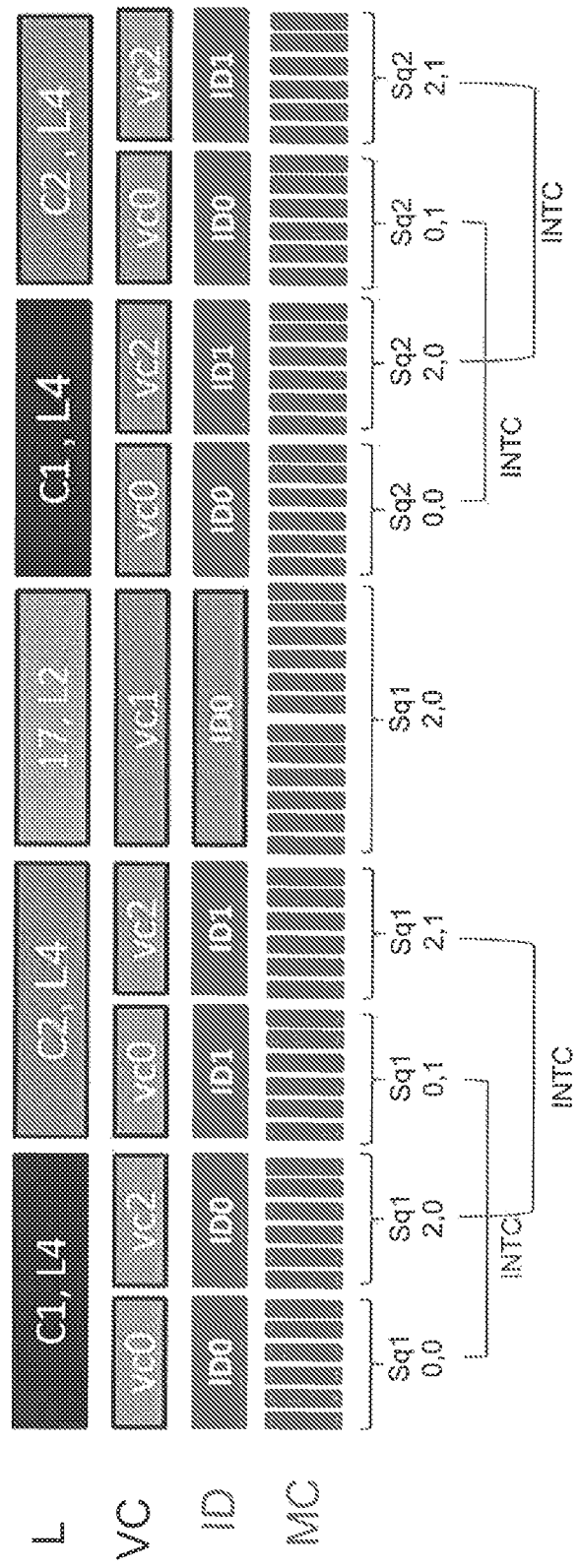

The checks made by the control module 15 on the sequences Sq of messages are described in the diagram of FIG. 5. Appearing in the first row is the hierarchical level, L, and the element involved, whether processor module C1 or C2 or else supervisor module 17. The messages MC marked with the identifiers ID0 and ID1 are encapsulated in various sets of messages Sq (Sq1 and Sq2) and included within the various logic channels VC. They are subjected to two types of checks by the control module 15:

intra-channel check ITC (not represented in FIG. 5), which is applied to messages that belong to one and the same logic channel VC and to one and the same identifier ID;

inter-channel check INTC, which is applied to messages MC that belong to different logic channels VC (for instance, first message Sq1 0,0 of ID0 compared with first message Sq1 0,1 of ID1, second message Sq1 2,0 of ID0 compared with second message Sq 2,1 of ID1, etc.); these inter-channel checks INTC are made in addition to, and at a higher level than, the intra-channel checks ITC that regard consistency of the messages coming from each of the channels.

It should be emphasized that FIG. 5 represents the messages according to their origin and not the temporal sequence with which these are transmitted.

The structure of the communication protocol PL described and of the checks that are carried out on the sets of the messages finds direct correspondence in the functional architecture of the control module 15 down to its implementative micro-architecture, as illustrated with reference to FIG. 6.

As has been mentioned, implementations are possible both of a software type for the control module and of a hardware type with dedicated logic, for example in an FPGA device or else in an ASIC.

FIG. 6 shows the main functions integrated in the control module 15.

Figure 9:
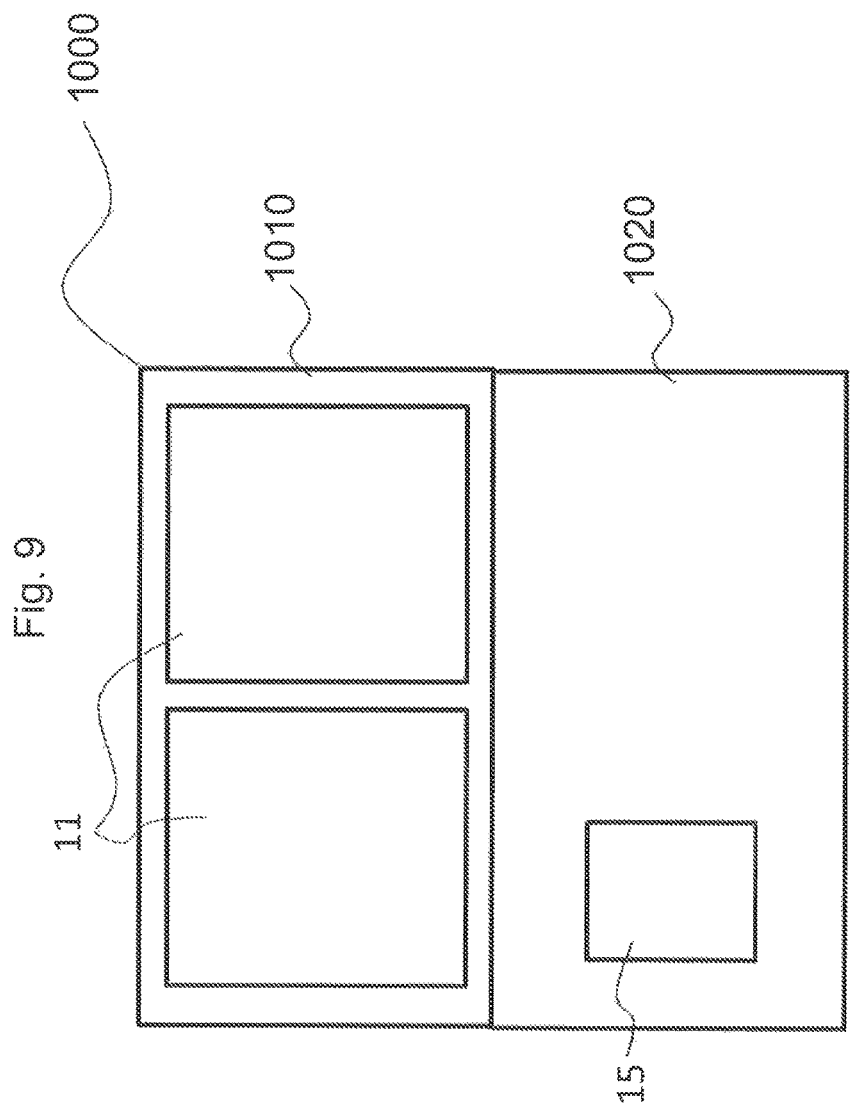
FIG. 9 shows a principle diagram of an implementation of the system on SoC (System-on-Chip), with a two-core symmetrical multiprocessor.
Figure 10:
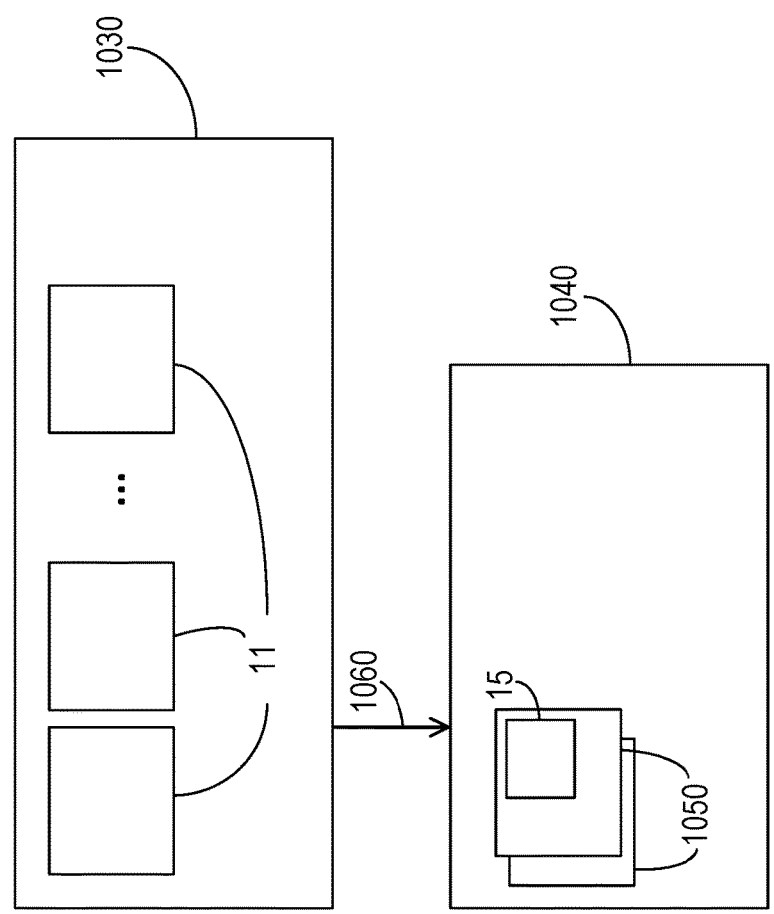

The level of description of FIG. 6 reflects dedicated hardware units, but may equally reflect functional units used for providing, for example, an embodiment thereof as embedded software in a processor module separate from the multiprocessor 10 rather than as dedicated hardware in an FPGA device or else in an ASIC. Purely by way of example, FIG. 9 shows a possible implementation of the architecture proposed on a System-on-Chip (SoC) 1000, in particular with two-core symmetrical multiprocessor, in which two processors 11 are contained in a "hard macro" 1010, whereas the control module 15 is a software module run on a redundant processor implemented in a programmable portion 1020 (FPGA) of the SoC 1000.

To return to FIG. 6, designated by 112 is a bus interface towards the communication bus 12, which comprises a configuration-and-status interface module 112c, and buffers 112b for the messages of the various channels ID0 and ID1. It further comprises a module 112a for a check of a CRC type on the packets arriving.

Designated by 113 is a timing module, for checking timing, in particular for checking that the execution time remains within the extremes set for the check.

Designated by 114 is a module for the inter-channel checks (INTC operations), which comprises a comparator 114a for inter-channel comparison of the data of the channels and a hardware fault injector 114b.

Designated by 116 is a module for the intra-channel checks (ITC operations), which comprises modules 116a, 116b, 116c for checking the arrival time, the order, and the value of the data arriving.

The data are supplied to the aforesaid modules 114 and 116 by a message-dispatcher module 115, which preferably comprises a direct-memory-access (DMA) module 116a and a message-controller module 116b.

Designated by 111 is an error controller, which, via a programmable event router sends alarms to the module 16. The information and the signals regarding the data and alarms that derive from anomalous conditions detected from the comparisons between the physical channels ID0 and ID1 or against the expected ranges of values or pre-calculated results, in the modules 114 and 116 are kept separate (from the logic, electrical, and physical standpoint) as required by the reference safety standards (see, for example, IEC61508 "Safety design recommendations"). Once again with reference to FIG. 6 the alarms are indicated by a dashed line. The alarm sources indicated regard detection of anomalies in the following comparisons:

inter-channel checks INTC (module 114)—this type of comparisons includes comparison of values, for example values expected to be the same calculated by different cores of the multiprocessor, and comparison of pre-calculated expected values; they generate an inter-channel alarm Alintc;

intra-channel checks ITC (module 116)—this type of comparisons includes comparisons with pre-calculated expected values, i.e., checking against a pre-defined reference range (for example, of operating temperature or voltage); they generate an intra-channel alarm Alitc;

checks on the timings (module 113), for example on whether the execution time remains within the extremes set for the check; they generate a timing alarm Alt; and anomalies in the structure and composition of the message from the formal standpoint, in the example considered, the failure of a check of a CRC type made by the CRC module 112a on the text of a message at input to the interface 112, this check generating an alarm ALc.

Finally, the control module 15 comprises a fault-injection module 117.

As may be understood from the description of FIG. 6, the logic modules 51 and 61 are not implemented separately, but the functions necessary for each of these logic modules are basically carried out by the modules 114, 116, and 113.

Hence, from the above description the advantages of the invention emerge clearly.

The method and architecture described advantageously make it possible to satisfy given requirements of functional safety for a multi-channel or single-channel system even one that is highly integrated in a multiprocessor on a single integrated circuit.

The procedure described above of decomposition of the programs and partitioning of the self-test operations into three separate operations, namely, self-testing via diagnostic tests, self-testing via monitoring of the system values, and self-testing via comparison of the intermediate results, as well as the corresponding Eq. (1) enable precise identification of the coverage targets to be assigned to each of the three self-test operations, likewise enabling distribution of the targets in an optimised way, i.e., lowering the targets for the operations that—for the particular type of system to which the method described is applied—would require a major design effort to be achieved, and, instead, raising the targets for the operations that in such a context are easier to carry out.

The solution described moreover enables mitigation of the problem of common-cause failures (CCFs) through introduction of an element, basically represented by a control module, i.e., an independent electronic-timer module, periodically queried by the processor at pre-set time intervals for carrying out the three different self-test operations described with a given periodicity or frequency.

In particular, the above is obtained by carrying out in the self-test operations:

a checking function of both of a temporal type and of a value and sequence type by: imposing checks on occurrence of pre-defined events within pre-defined time windows and respect of pre-defined sequences; and checking numeric values, determined or in any case calculated by the processors, that correspond to the aforesaid diagnostic-self-test operations;

detection of the occurrence of CCFs in the processors by comparison of values calculated by the processors, or else measured via sensors available in the processors or in general in the multiprocessor, against pre-calculated correct values corresponding to the aforesaid operations of self-testing of the system values; and implementation of protocols for determining the integrity of the processors based upon cross-checking, which correspond to the aforesaid operations of self-testing of the intermediate results of the programs.

In this regard, it is emphasized how the highly integrated and homogeneous circuit embodiments of the multiprocessors are the ones that guarantee the highest performance and the lowest cost of the system, but at the same time are liable to problems of CCF, which are all the more important and difficult to prevent and/or detect the more the architectures are homogeneous and highly integrated. The presence of CCFs is the main reason why this type of architectural and implementative solutions are not widely used in the world of applications subject to safety standards in the automotive and industrial fields, with consequent loss of the economic benefit that could be achieved.

The solution described moreover enables combination of the control software of virtual machines (for example, hypervisors) with dedicated software programs that implement the aforesaid self-test operations and that, by their joint use, enable the requirements necessary for achieving the levels of integrity of functional safety required in industrial and automotive applications to be met.

The method and architecture described moreover enable a logic and temporal monitoring, in particular optimised for multicore systems with support for cross-checking between cores;

implementation of diagnostics both for architectures with loo1 voting and for architectures with loo2 voting;

monitoring of information regarding the hardware of the multicore (status, temperature, supply state, etc.);

self-monitoring;

system compliant with the specification IEC 61508 2nd Ed. that can be integrated in SIL-2 and SIL-3 systems;

standard interface to be used with the software;

configurable reaction; and possibility of optimisation for the implementation technology chosen (FPGA or ASIC).

Of course, without prejudice to the principle of the invention, the details and the embodiments may vary, even considerably, with respect to what is described herein purely by way of example, without thereby departing from the sphere of protection, this sphere of protection being defined by the annexed claims.

In the safety architecture considered by way of example, the control module 15 can be associated to a voter module that is commonly used in multichannel architectures for comparing continuously the outputs of the channels before these are used by the program, or by the actuators, evaluating, according to the voting techniques, the safe output to be supplied to the program. An OR gate can receive the output of the control module 15 and the output of the voter and detect possible differences between these outputs. Detection of a difference determines a condition of detection of failure that forces the system to reach or maintain a safe state as defined for the program that is being executed.

The term "library" has been used in the present description for defining the software modules of diagnostic-self-test programs, but may be applied also to the modules for self-testing of the system data (which, as has been said, may be comprised in the diagnostic-self-test library) and to the self-test modules for comparison between intermediate results of the sub-programs.

The aforesaid libraries or software modules comprising the self-test programs may, for example, be stored in a flash memory available on the card or else integrated that comprises the processing system and is then loaded in a RAM of the processing modules.

Even though the method described herein refers to a processing system, in particular a multiprocessor system, and control module, the operations of decomposition into sub-programs in themselves also apply just to the processing system, without independent control module. In other words, forming the subject of the present disclosure is also a method for executing programs in an electronic system for applications provided with functional safety including a processing system of the single-processor or multiprocessor type, comprising performing an operation of decomposition of a program that includes a safety function and is to be executed via the aforesaid system into a plurality of parallel sub-programs; assigning execution of each parallel sub-program to a respective processing module of the system, in particular a processor of the aforesaid multiprocessor architecture or virtual machine associated to one of the aforesaid processors; carrying out in the system, periodically according to a program cycle frequency during normal operation of the system, in the framework of the aforesaid safety function self-test operations associated to each of the aforesaid sub-programs and to the corresponding processing modules on which they are run, wherein the above self-test operations comprise diagnostic-self-test operations, which carry out diagnostic self-tests, operations of self-testing of measured system values, self-test operations of comparison between intermediate results of the sub-programs, and these self-test operations comprise generating respective self-test data corresponding to the self-test operations and carrying out operations of checking on these self-test data, execution of the aforesaid operation of decomposition of the program into a plurality of parallel sub-programs obtaining a coverage target for each of the aforesaid self-test operations that is associated to a respective sub-program or processing module, in such a way that it respects a given failure-probability target.

The invention claimed is:

1. A method for executing in a system an application program provided with functional safety, the system including a single-processor or multiprocessors, and an independent control module, said method comprising:
    performing an operation of decomposition of the program that includes a safety function and is to be executed via said system into a plurality of parallel sub-programs;
    assigning execution of each parallel sub-program to a respective processing module of the system, in particular a processor of said multiprocessors or a virtual machine associated to one of said processors; and
    carrying out in the system, periodically according to a cycle frequency of the program during normal operation of said system, a framework of safety function diagnostic-self-test operations associated to each of said sub-programs and to the corresponding processing modules on which they are run;
    wherein carrying out said self-test operations comprises:
    generating respective self-test data corresponding to the self-test operations and carrying out checking operations on said self-test data;
    exchanging said self-test data continuously via a protocol of messages with the independent control module; and
    carrying out at least part of said checking operations in said independent control module; and
    wherein performing an operation of decomposition of the program comprises decomposition of the program into a plurality of parallel sub-programs to obtain a coverage target for each of said self-test operations that is associated to a respective sub-program or processing module in such a way that it respects a given failure-probability target.

2. The method according to claim 1, wherein said given failure-probability target is a function of a coverage value determined by said diagnostic-self-test operations, of a coverage value determined by the operations of self-testing of system values measured on a processing system, and of a coverage value determined by operations of comparison between intermediate results of the sub-programs.

3. The method according to claim 1, further comprising calculating said failure-probability target, including:
    considering said sub-programs as inputs of an AND logic function having as many inputs as there are sub-programs;
    breaking down said AND logic function into a plurality of two-input AND logic functions, each having as inputs a pair of said sub-programs, calculating a product of failure probabilities corresponding to an output for each two-input AND gate by calculating a complement of a common-cause-failure fraction and of an exposure time; and
    calculating said probability target as a function of results of the calculating of the products of failure probabilities, added to a value obtained by applying OR functions to common-cause failures corresponding to the pairs of sub-programs, multiplied by the common-cause-failure fraction.

4. The method according to claim 1, wherein said failure probabilities of the sub-programs are evaluated as a function of a union of said coverage value determined by said diagnostic-self-test operations for each sub-program, said coverage value determined by the operations of self-testing of system values measured on architecture, and said coverage value determined by the self-test operations of comparison between intermediate results of the sub-programs.

5. The method according to claim 1, wherein said system implements a virtual-machine management module, which generates virtual machines on which said sub-programs can be run.

6. The method according to claim 1, wherein said operation of carrying out at least part of said checking operations in said independent control module comprises:
    carrying out comparison of diagnostic-self-test data corresponding to intermediate results of calculations made on the processors of a processing system of a single-processor or multiprocessor type according to the diagnostic-self-test operations with a set of pre-calculated and expected values stored;
    carrying out comparison of application-self-test data produced by operations of comparison between the intermediate results of the sub-programs; and
    carrying out comparison of system-self-test data against expected ranges stored.

7. The method according to claim 1, wherein said independent control module is configured for carrying out on the self-test data:

a check on a value for verifying whether intermediate results, in particular application-self-test data and/or diagnostic-self-test data, are the same or have been corrected;

a check on a plurality of ranges of values for verifying whether a value of a self-test datum measured on the system belongs to a pre-defined range of values;

a check on an order for verifying whether order of the messages is correct; and a check on a plurality of times of arrival of the messages.

8. The method according to claim 1, wherein said operation of exchanging said self-test data continuously via a protocol of messages with the independent control module comprises organizing the messages in logic channels according to a hierarchical level that produces said messages and according to a physical channel that produces said messages.

9. The method according to claim 8, wherein said operation of carrying out at least part of said checking operations in said independent control module comprises carrying out operations of:

intra-channel check applied to messages that belong to one and the same logic channel and to one and the same physical channel; and inter-channel check applied to messages that belong to different logic channels.

10. A method for executing in a system an application program provided with functional safety that includes a processing system of a single-processor or multiprocessors, said method comprising:

performing an operation of breaking-down of the program that includes a safety function and is to be executed via said system into a plurality of parallel sub-programs;

assigning execution of each parallel sub-program to a respective processing module of the system, in particular a processor of said multiprocessor processing system or a virtual machine associated to one of said processors; and carrying out in the system, periodically according to a cycle frequency of the program during normal operation of said system, in a framework of safety function, self-test operations associated to each of said sub-programs and to the corresponding processing modules on which they are run;

wherein said self-test operations comprise:
diagnostic-self-test operations, which carry out diagnostic-self-tests;
operations of self-testing of measured system values; and
self-test operations of comparison between intermediate results of the sub-programs;
wherein carrying out said self-test operations comprises:

generating respective self-test data corresponding to self-test operations and carrying out checking operations on self-test data; and wherein performing an operation of breaking-down the program comprises breaking-down the program into a plurality of parallel sub-programs to obtain a coverage target for each of said self-test operations associated to a respective sub-program or processing module in such a way that it respects a given failure-probability target.

11. A system comprising a processing system of at least one single computer hardware processor and an independent control module, configured for implementing the method according to claim 1.

12. At least one non-transitory computer readable medium having program instructions that can be loaded into memory of at least one computer system, to cause the computer system, in response to execution of the program instructions by one or more processors of the computer system, to implement the method according to claim 1.

* * * * *